United States Patent [19]

Shumate

[11] Patent Number: 4,663,968

[45] Date of Patent: May 12, 1987

[54] EXTENDED PITCH DISPLAY FOR ATTITUDE GYRO INDICATOR

[75] Inventor: Charles H. Shumate, Round Rock, Tex.

[73] Assignee: The BF Goodrich Company, Akron, Ohio

[21] Appl. No.: 827,592

[22] Filed: Feb. 10, 1986

[51] Int. Cl.$^4$ ............................................. G01C 19/30
[52] U.S. Cl. .................................................. 73/178 R
[58] Field of Search .............. 73/178 R, 178 H, 178 T

[56] References Cited

U.S. PATENT DOCUMENTS

| | | | |
|---|---|---|---|
| 3,357,242 | 12/1967 | Bonnell et al. | 73/178 R |
| 3,988,927 | 11/1976 | Cox | 73/178 R |
| 4,019,702 | 4/1977 | Annin | 73/178 T |
| 4,094,200 | 6/1978 | Chombard | 73/178 R |

Primary Examiner—Donald O. Woodiel
Attorney, Agent, or Firm—Glaser, Griggs & Schwartz

[57] ABSTRACT

Continuous display of pitch attitude beyond normal limits of plus or minus 20 degrees is provided by an extended pitch indicator whose operation is coordinated with a primary pitch indicator which provides pitch information through primary ascent and descent ranges (plus or minus 20 degrees). Operation of the extended pitch indicator is coordinated with operation of the primary pitch indicator in such a manner that the extended pitch indicator is hidden from view during flight maneuvers within the primary climb and dive ranges, but which is automatically exposed during flight maneuvers outside of the primary climb and dive ranges. In the preferred embodiment, the extended pitch indicator element is attached to the pitch gimbal and a horizon mask 15 interposed between the extended pitch indicator and the primary pitch indicator scale. A window opening formed in the horizon mask is uncovered as the primary pitch indicator element is displayed, thereby exposing the extended pitch indicator and its markings which indicate the extended pitch information lying within the extreme pitch limits.

9 Claims, 6 Drawing Figures

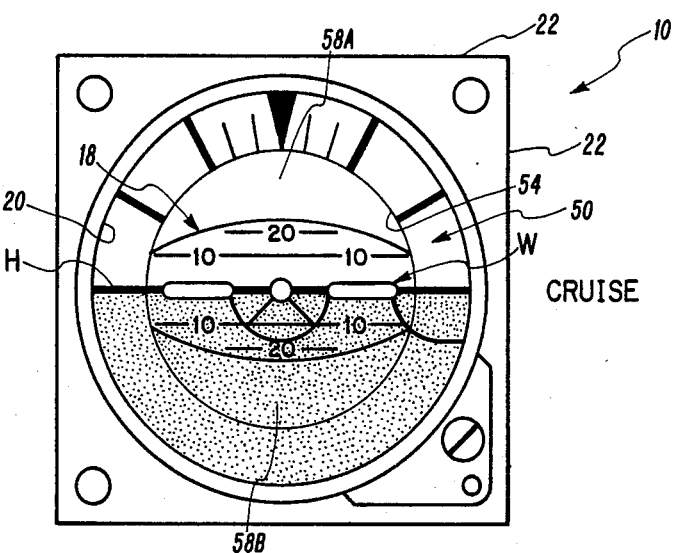
FIG. 3 — CRUISE
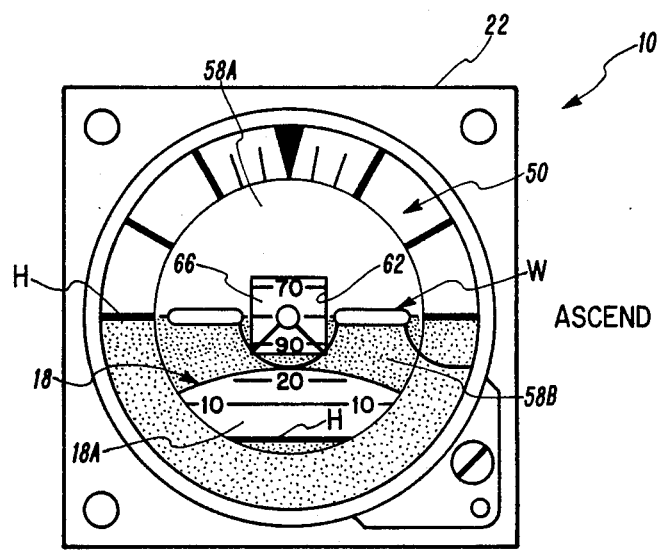
FIG. 4 — ASCEND
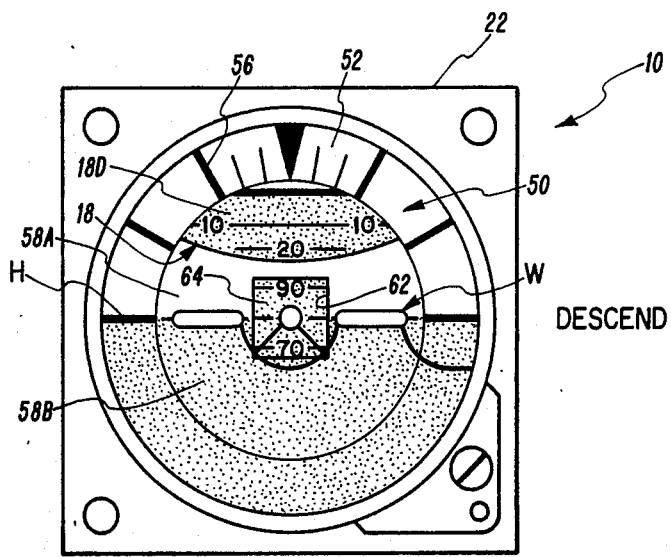
FIG. 5 — DESCEND

EXTENDED PITCH DISPLAY FOR ATTITUDE GYRO INDICATOR

FIELD OF THE INVENTION

This invention relates generally to aircraft flight instruments, and in particular to a gyro-driven attitude indicator.

BACKGROUND OF THE INVENTION

Conventional aircraft attitude indicator instruments display an artifical horizon which moves up or down as the aircraft pitches, and which also rotates clockwise or counterclockwise as the aircraft rolls. The artificial horizon display is used by the pilot for reference purposes when the true horizon is obscured by weather or darkness or when the pilot is otherwise flying under instrument flight rules (IFR). The artificial horizon line is driven by a gyroscope whose spin axis is oriented according to true gravity vertical. The artificial horizon is mechanically coupled to gyro roll and pitch gimbal supports to cause the artificial horizon to move correspondingly in roll and pitch as observed with reference to a fixed airframe symbol which is superimposed onto the display.

DESCRIPTION OF THE PRIOR ART

In the course of ordinary flight procedures, an aircraft will ascend, cruise and descend. During take-off and in-flight maneuvering, the angle of ascent usually does not exceed 20 degrees, and is typically no more than 10 degrees. Likewise, an aircraft will descend during landing on a glide scope of approximately 10 degrees, and occasionally during maneuvering, may descend along a pitch of as much as 20 degrees. Thus the standard attitude indicating instrument provides a continuous display of aircraft pitch within limits of plus or minus 20 degrees.

Because normal pitch maneuvers occur within limits of plus or minus 20 degrees, conventional attitude indicator instruments are not calibrated or marked for displaying pitch information beyond such normal limits. That is, the typical pitch indicator will have markings of 10 degrees and 20 degrees for ascending, and 10 degrees and 20 degrees for descending, relative to an artificial horizon. Pitch displacements which exceed those limits are not marked or calibrated with the result that the pilot can only observe that the aircraft is being operated in an unusual and possibly dangerous attitude. In most conventional pitch indicating instruments, the gimbal display coupling moves through a dead band and is unable to convey accurate pitch information outside of the normal plus or minus 20 degree limits.

SUMMARY OF THE INVENTION

It will therefore be appreciated that a continuous display of pitch attitude beyond the normal limits of plus or minus 20 degrees is desirable for providing the pilot with useful information during IFR flight operation. Accordingly, the pitch indicating instrument of the present invention provides a continuous display of pitch information by a primary pitch indicator which indicates pitch information through primary ascent and descent ranges (e.g. plus or minus 20 degrees) in combination with an extended pitch indicator which provides a calibrated, visual display of pitch information for ascent and descent operations which occur outside of the primary climb and dive ranges (30 degrees to 90 degrees ascent and 30 degrees to 90 degrees descent). Operation of the extended pitch indicator is coordinated with operation of the primary pitch indicator in such a manner that the extended pitch indicator is hidden from view during flight maneuvers within the primary climb and dive ranges, but which is automatically exposed for observation during flight maneuvers outside of the primary climb and dive ranges.

According to the preferred embodiment, a primary pitch indicator is coupled to the pitch gimbal of a gyroscope for indicating ascent and descent attitudes through primary climb and dive ranges, respectively. A horizon mask is attached to the roll gimbal of the gyro, with the mask bearing an artificial horizon line and having a window opening coincident with the horizon line. An extended pitch indicator element is attached to the pitch gimbal and interposed between the pitch gimbal and the horizon mask for observation through the horizon mask window. In this combination, pitch information lying within plus or minus 20 degrees with respect to an artifical horizon line is indicated by the primary pitch indicator, but when the aircraft assumes an attitude outside of normal limits (plus or minus 20 degrees), the mask window is uncovered as the primary pitch indicator element is displaced, thereby exposing the extended pitch indicator and its markings which indicate the extended pitch information lying within the extreme pitch limits 30 degrees-90 degrees ascent and 30 degrees-90 degrees descent.

Accordingly, the aircraft flight attitude indicating instrument of the present invention provides a continuous display of aircraft pitch attitude, with the extended pitch markings providing a continuous display of actual aircraft pitch attitude with movement of the calibration markings providing an instant indication of an unusual attitude, and whether the pitch situation is improving or getting worse. That is, the pilot can tell at a glance that the aircraft has assumed an unusual and possibly dangerous attitude. By comparing the movement of the extended pitch markings with respect to the fixed airframe reference, the pilot can take corrective action to re-establish the desired airframe attitude.

Other features and advantages of the present invention will be appreciated by those skilled in the art upon reading the detailed description which follows in conjunction with reference to the attached drawings.

BRIEF DESCRIPTION OF THE DRAWINGS

FIG. 3 is a front elevational view of the pitch indicator instrument of FIG. 1 in which the indicator elements are aligned in cruise attitude;

FIG. 4 is a view similar to FIG. 3 in which the extended pitch indicator element is exposed, thereby indicating an excessive ascent pitch condition;

FIG. 5 is a view similar to FIG. 3 in which the extended pitch indicator element is exposed, thereby indicating an excessive descent pitch condition; and, FIG. 6 is a side elevation view of the attitude indicator instrument with parts thereof corresponding to the dive orientation depicted in FIG. 5.

DETAILED DESCRIPTION OF THE PREFERRED EMBODIMENT

Figure 1:
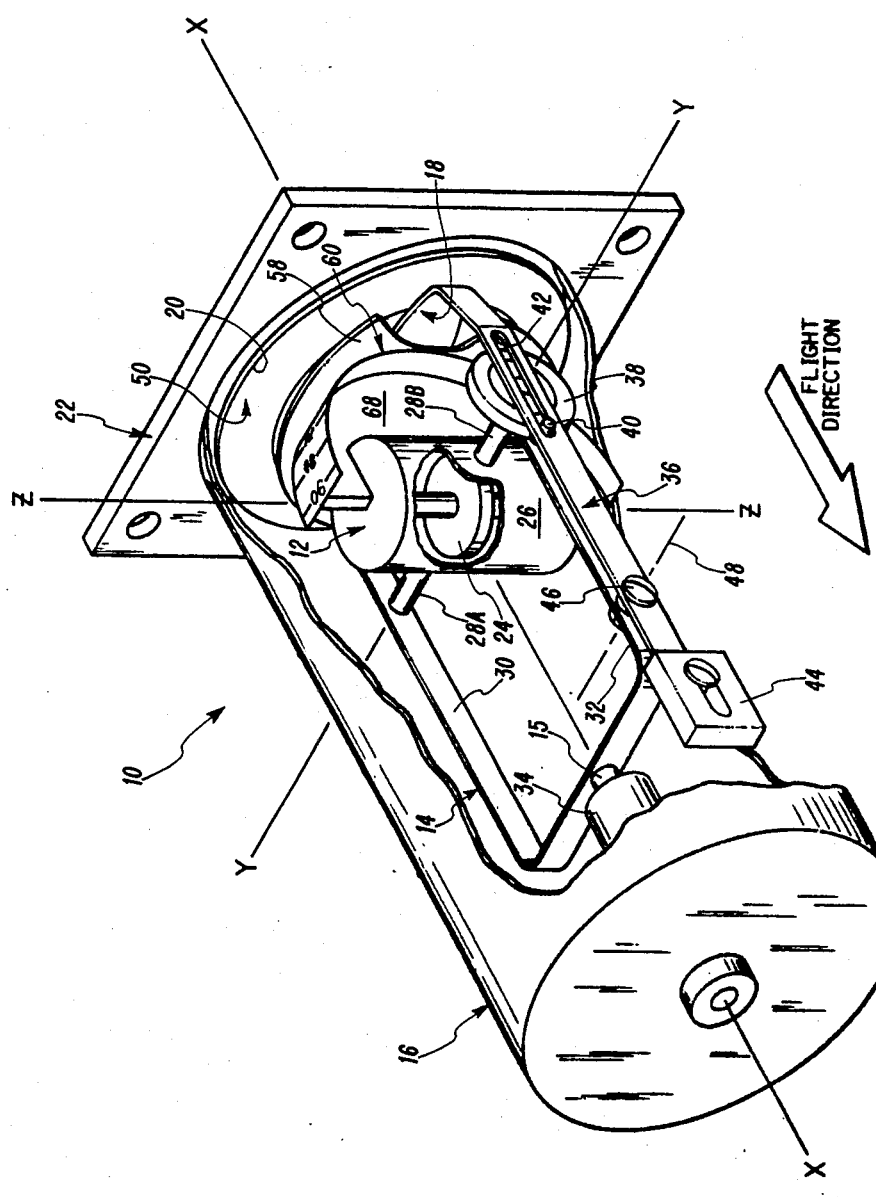
FIG. 1 is a perspective view of a gyro-driven attitude indicator flight instrument, partly broken away.

In the description which follows, like parts are indicated throughout this specification and drawings with the same reference numerals, respectively. The drawings are not necessarily to scale and certain parts have been exaggerated to better illustrate details of the present invention.

Referring now to FIG. 1, an attitude indicator instrument 10 includes a gyro assembly 12 mounted on a yoke assembly 14 within a housing 16. A primary pitch indicator 18 is mechanically coupled to the yoke 14 and can be observed through an opening 20 formed within a face plate 22.

The gyro assembly 12 includes a gyro wheel 24 which is driven by an electrical motor (not illustrated) about a spin axis Z. The gyro wheel 24 is mounted in a rotor housing 26 which is rotatably coupled by a pitch gimbal arms 28A, 28B to left and right roll gimbal arms 30, 32, respectively. The gyro assembly 12 is rotatable about pitch axis Y, and is also rotatable about roll axis X. The roll gimbal yoke assembly 14 includes a shaft 15 which is journalled in a cantilevered bearing assembly 34 to the housing 16.

According to the foregoing arrangement, the vertical gyro 12 when erected, tends to remain fixed in space, along the true vertical spin axis Z, with the instrument housing 16 being freely rotatable with respect to the vertical gyro 12 about the roll axis X and the pitch axis Y. The vertical gyro 12 is calibrated with the spin axis Z being aligned with true gravity vertical. The instrument housing 16 is attached to the airframe and transmits the roll axis X and pitch axis Y movements of the aircraft with respect to true gravity vertical.

The vertical gyro 12, due to gyroscopic principles, will remain aligned with the true gravity vertical provided that its speed is maintained constant and that no external forces act upon it. Because of its erection mechanism, a compensating torque is generated in response to a force that would oppose true gravity vertical, with the compensating torque restoring the gyro axis into alignment with true gravity vertical. Pitch and roll movements of the aircraft are thereby translated into corresponding pitch and roll movements of the pitch and roll gimbals.

The primary pitch indicator 18 is movably coupled to the pitch and roll gimbals by means of a coupling arm 36 which is pivotally mounted onto roll gimbal arm 32. It is also coupled to the pitch gimbal arm 28B by means of a pitch wheel 38. Pitch wheel 38 is rigidly attached to pitch gimbal arm 28B and is movably coupled to pivot arm 36 by means of a pin 40 which is slidably received within a slot 42 formed along the longitudinal axis of the coupling arm 36. The primary pitch indicator element 18 is attached to the aft end portion of the coupling arm 36, and a counter-balance weight 44 is attached to the forward end of coupling arm 36. The position of the counter-balance weight 44 is adjusted so that the complete primary pitch indicator assembly 18, 36, 44 is balanced and thus will not affect the operation of the vertical gyro assembly 12. The alignment of the pitch wheel 38 is such that when the gyro assembly 12 is aligned at true gravity vertical the pitch indicator 18 will be aligned and centered upon the airframe reference symbol W as shown in FIGS. 2 and 3.

Coupling arm 36 is pivotally mounted onto the roll gimbal arm 32 by a pivot bearing 46. According to this arrangement, the primary pitch indicator element 18 is carried in rotation about the roll axis X as the yoke 14 rotates within roll bearing 34. Pitch movements of the aircraft are transmitted to the primary pitch indicator 18 by the pitch inverter wheel 38 which moves the pitch indicator coupling arm 36 upwardly and downwardly about the pivot-bearing axis 48. The diameter of the pitch wheel 38 is coordinated with the length of the pivot arm 36 to provide a one-to-one correspondence of pitch movement between the vertical gyro 12 and the primary pitch indicator element 18, within a predetermined range with respect to the airframe reference W.

Figure 2:
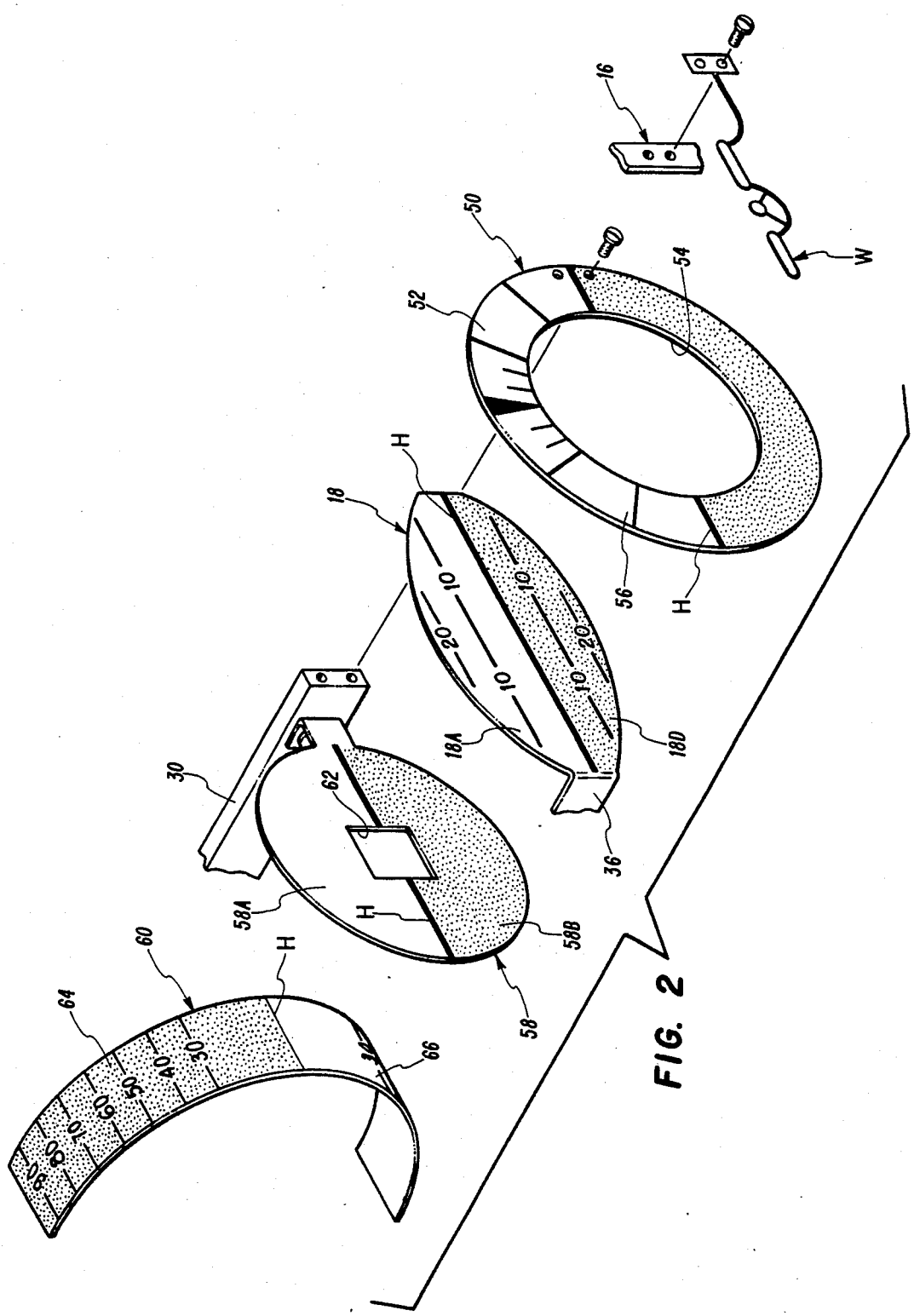
FIG. 2 is an exploded perspective view of certain indicator elements which form a part of the instrument shown in FIG. 1.
Figure 6:
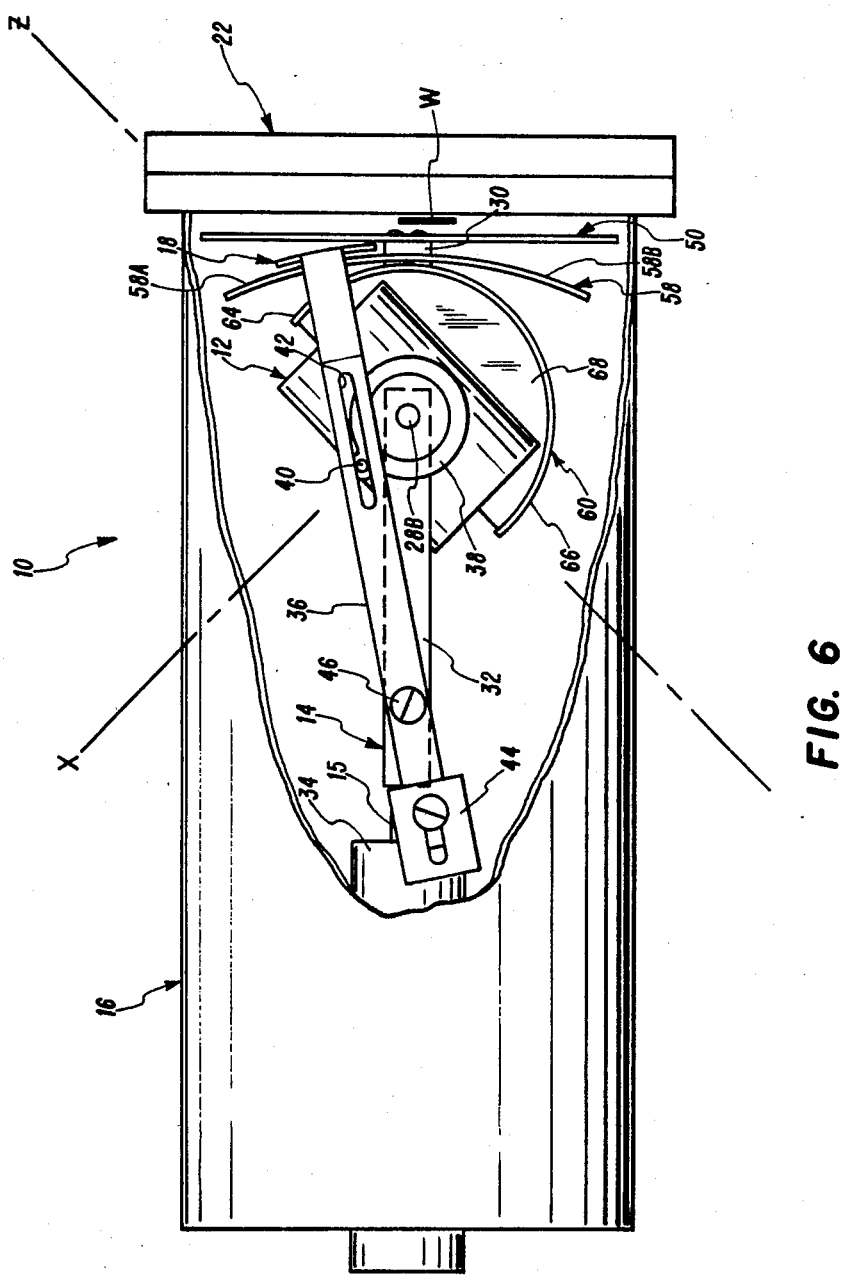

Referring now to FIG. 2, the primary pitch indicator element 18 is a curved plate having a display surface on which an artificial horizon line H is imprinted. The display surface is divided by the artificial horizon line H, with the upper surface area 18A of the primary pitch indicator element bearing scribe marks designated 10 and 20 for indicating 10 degrees and 20 degrees, respectively, with respect to the artificial horizon line H. Preferably, the upper dispaly surface 18A is painted a blue color, thereby designating the upper portion of the indicator element as being the primary pitch (climb) scale. The lower surface portion 18D bears similar 10 degree and 20 degree scribe marks and is preferably painted a brown color, thereby designating that portion of the primary indicator as being the dive scale.

An annular roll indicator dial 50 is mounted immediately to the rear of the primary pitch indicator element and is fastened onto the roll gimbal arm 30. The roll indicator dial is divided by an artificial horizon line H, with the upper portion bearing a roll indicator scale 52. Formed within the roll indicator dial 50 is a circular aperture 52 through which the primary pitch indicator 18 may be observed. Both the primary pitch indicator 18 and the roll indicator dial 50 are mechanically fastened to the roll gimbal yoke 14, so that they are always perfecty aligned in roll displacement.

The primary pitch indicator 18 actually moves in inverse relation with respect to corresponding pitch movments of the aircraft. That is, when the aircraft climbs, the primary pitch indicator rotates in the downward direction and when the aircraft dives, the primary pitch indicator rotates in the upward direction. However, to an observer, using the artificial horizon H as a reference, the airframe reference symbol W will appear to move with respect to the artificial horizon, with the overall attitude display being in one-to-one correspondence with actual pitch movements.

Referring now to FIGS. 2 and 3, the primary pitch indicator 18 is in the form of a thin curved plate having an oval outline and which occupies approximately two-thirds of the display area within the roll dial aperture 54. Extreme excursions of the primary pitch indicator 18 in either climbing or diving attitudes will cause the primary pitch scale 18 to be displaced far below or far above the airframe reference W, with the result that the only information provided to an observer is that the aircraft is apparently in an unusual and possibly dangerous attitude, depending upon airspeed and elevation. This is because reliable information outside of the normal pitch and dive range is not developed by the primary pitch indicator, due to the "dead band" effect which arises as a result of the nature of the coupling mechanism.

Reliable information outside of the normal range could be useful should the aircraft be ascending along a slope which would cause the aircraft to stall, or should the aircraft be in an extreme dive attitude at an unsafe air speed and elevation. With conventional aircraft attitude indicators pitch information in the "dead band" region would be indicated by the primary pitch indicator 18, being in either the extreme up or down position and no longer maintain corresponding movement to the aircraft pitch attitude. For example, a pitch angle of 40 degrees would appear the same as one of 90°. The present invention would indicate these extreme pitch attitudes by combining a horizon mask 58 and an extended pitch indicator element 60 with the primary pitch indicator 18. In the preferred arrangement, the extended pitch indicator element 60 is mounted directly onto the gyro rotor housing 26 and immediately in front of the horizon mask 58. This positions the horizon mask 58 between the extended pitch indicator 60 and the primary pitch indicator 18.

In the foregoing arrangement, the horizon mask 58 is anchored onto the roll gimbal arm 30, and bears an artificial horizon line H with a window opening 62 formed coincident with the horizon line. The extended pitch indicator element 60 is aligned with the horizon mask for observation through the horizon mask window 62. As can best be seen in FIG. 3, during normal flight maneuvers, the primary pitch indiator element 18 covers the observation window 62 so that the extended pitch indicator 60 is not visible. However, when the primary pitch indicator is displaced beyond the normal flight maneuver limits, the window 62 is exposed, thereby revealing the extended pitch indicator 60.

The extended pitch indicator 60 is formed of a thin, rectangular plate of a lightweight metal, such as aluminum, and has a radius of curvature which is adapted to present extended climb and dive information in coordination with the climb and dive information presented by the primary pitch indicator. That is, the extended pitch indicator 60 is provided with an extended dive scale 64 having index markings corresponding with the range 30 degrees-90 degrees in 10-degree increments. Likewise, an extended climb scale 66 is provided, with index markings corresponding in 10-degree increments in the range of 30 degrees-90 degrees.

Since the primary pitch indicator 18 is driven in inverse pitch relation with respect to the corresponding pitch movement of the vertical gyro, it is necessary to invert the climb and dive presentations of the extended pitch indicator 60. Accordingly, the extended dive pitch indicator 60, because it is anchored onto the gyro rotor housing 26, moves exactly with the gyro, but inversely with respect to the primary pitch indicator. For that reason, the extended dive scale and climb scales are inverted with respect to the climb and dive scales of the primary pitch indicator.

In the foregoing combination, pitch information lying within plus or minus 20 degrees with respect to the artificial horizon line H is indicated by the primary pitch indicator, but as the aircraft assumes an attitude outside of normal limits, for example outside of 20 degrees climb, the mask window is uncovered as the primary pitch indicator element is displaced, thereby exposing the extended pitch indicator 60, and in particular, the extended climb scale 66 as can best be seen in FIG. 4. In FIG. 4, the pitch attitude is 80 degrees ascending, with the primary pitch indicator element 18 shown bottomed out in its extreme retracted position. Because of the 10 degree index markings which appear on the extended pitch scale, the pilot can confirm by movement of the index markings with respect to the airframe symbol W that present flight maneuvers are correcting the pitch to a desired pitch or else the present flight maneuvers are making the attitude worse. With this information, the pilot can take corrective action to reestablish the desired airframe attitude.

FIG. 5 illustrates a similar display in which the aircraft has assumed an extreme dive attitude of 80 degrees. It should be noted that the extended dive scale 64 is exposed through the horizon mask window 62. Preferably, the extended dive display scale 64 is color-coded to match the horizon mask area 58B (preferably brown). Likewise, the color of the extended climb scale 66 is coordinated with the color of the upper horizon mask display area 58A (preferably blue). In the drawing figures, the dive regions are stippled, and the climb areas are blank for purposes of illustration. However, the colors brown and blue are preferred for the dive and climb display areas, respectively.

The extended dive scale 64 and extended climb scale 66 are symmetrically disposed about the horizon line H. The extended pitch indicator element 60 may be attached directly onto the gyro rotor housing 26, or it may be attached indirectly in offset relation by a mounting bracket 68.

In operation, the flight attitude indicating instrument 10 provides a continuous display of aircraft roll and pitch attitude, with the extended pitch markings 64, 66 providing a continuous display of actual aircraft pitch attitude with movement of the calibration markings providing an instant indication of an unusual attitude, and whether the pitch situation is improving or getting worse. During normal flight maneuvers, that is for flight attitudes in which ascent or descent does not exceed 20 degrees, the primary pitch indicator obscures the horizon mask window, so that the extended pitch indicator is not visible. However, for flight maneuvers in which the aircraft assumes a pitch outside of the normal limits, the primary pitch indicator 18 is fully retracted downwardly as shown in FIG. 4, or is fully extended upwardly as shown in FIG. 5, with both extreme positions uncovering the horizon mask window 62 through which the extended pitch indicator is exposed.

According to the foregoing arrangement, pitch information lying within plus or minus 20 degrees with respect to the artificial horizon line H is indicated by the primary pitch indicator, but when the aircraft assumes an unusual attitude outside of the normal limits, the mask window 62 is uncovered, thereby exposing the extended pitch indicator 60 and its index markings, which indicate the extended pitch information lying within the extreme pitch limits 30 degrees-90 degrees, ascent and descent. Thus the pilot has an instant indication of an excessive ascent or descent pitch condition, and can take the appropriate corrective action to produce a desired flight attitude.

Although the invention has been described with reference to a specific embodiment, the foregoing description is not intended to be construed in a limiting sense. Various modifications of the disclosed embodiments will be suggested to persons skilled in the art by the foregoing specification and illustrations. It is therefore contemplated that the appended claims will cover any such modifications or embodiments that fall within the true scope of the invention.

What is claimed is:

1. In an aircraft flight attitude indicating instrument of the type having an airfame reference and a gyro erectable to true gravity vertical, said gyro being supported on pitch and roll gimbals that permit pitch and roll displacement of said airframe reference relative to said gyro wheel and having a primary pitch indicator movably coupled to said pitch gimbal for indicating aircraft climb and dive attitudes through primary climb and dive ranges, respectively, the improvement comprising an extended pitch indicator attached to said pitch gimbal, said extended pitch indicator bearing first and second groups of markings for indicating aircraft climb and dive attitudes relative to said airframe reference which occur outside of said primary climb and dive ranges, respectively.

2. An improved flight attitude indicating instrument as defined in claim 1, including:
   a horizon mask attached to said roll gimbal, said mask having a horizon line and a window opening coincident with said horizon line, said extended pitch indicator being interposed between said pitch gimbal and said horizon mask, and said extended pitch indicator being disposed for observation through said horizon mask window.

3. An improved flight attitude indicating instrument as defined in claim 1, said extended pitch indicator comprising a curved band.

4. An aircraft flight attitude indicating instrument comprising, in combination:
   an airframe reference;
   a gyroscope having a gyro wheel rotatable about a vertical spin axis with pitch and roll gimbals supporting said gyro wheel and permitting pitch and roll movement of said gyro wheel relative to said airframe reference;
   a primary pitch indicator movable coupled to said pitch gimbal for indicating climb and dive attitudes of said aircraft through primary climb and dive ranges, respectively;
   a horizon mask attached to said roll gimbal, said mask having a horizon line and a window opening coincident with said horizon line; and,
   an extended pitch indicator attached to said pitch gimbal, said extended pitch indicator being interposed between said pitch gimbal and said horizon mask, said extended pitch indicator being disposed for observation through said horizon mask window.

5. An improved aircraft flight attitude indicating instrument as defined in claim 4, including:
   a pitch inverter coupling interposed between said pitch gimbal and one of said primary and extended pitch indicators for reversing the direction of pitch rotation of the primary pitch indicator relative to the pitch rotation direction of the extended pitch indicator.

6. An improved aircraft flight attitude indicating instrument as defined in claim 4, said extended pitch indicator comprising a curved band having index markings for indicating aircraft climb and dive attitudes relative to said horizon line which occur outside of said primary climb and dive ranges, respectively.

7. A method for indicating aircraft pitch attitudes within and outside of a primary pitch range comprising the steps:
   indicating pitch attitude in a primary pitch range relative to an artificial horizon by a primary indicator coupled to a gyroscope;
   indicating pitch attitude in an range outside of the primary range by an extended pitch indicator coupled to said gyroscope;
   obscuring the extended pitch indicator during aircraft pitch attitudes assumed within the primary range; and
   exposing the extended pitch indicator during aircraft pitch attitudes assumed outside of the primary range.

8. A method for indicating aircraft pitch attitude as defined in claim 7, including the step of reversing the direction of pitch rotation of the primary indicator relative to the pitch rotation direction of the extended pitch indicator.

9. A method for indicating aircraft pitch attitude as defined in claim 7, wherein a horizon mask is interposed between the extended pitch indicator and the primary pitch indicator, wherein the obscuring and exposing steps are performed by covering and uncovering an observation window formed in said horizon mask by pitch movements of said primary indicator within and outside of said primary range, respectively.

* * * * *